(12) United States Patent
Kiernan et al.

(10) Patent No.: US 8,027,949 B2
(45) Date of Patent: Sep. 27, 2011

(54) CONSTRUCTING A COMPREHENSIVE SUMMARY OF AN EVENT SEQUENCE

(75) Inventors: Gerald G. Kiernan, San Jose, CA (US); Evimaria Terzi, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 12/174,407

(22) Filed: Jul. 16, 2008

(65) Prior Publication Data
US 2010/0017359 A1 Jan. 21, 2010

(51) Int. Cl.
G06F 17/00 (2006.01)
G06F 11/00 (2006.01)
G06N 7/00 (2006.01)
G06N 7/08 (2006.01)

(52) U.S. Cl. .......................................... 706/58; 714/48

(58) Field of Classification Search ...................... 706/58
See application file for complete search history.

(56) References Cited

U.S. PATENT DOCUMENTS

| | | | |
|---|---|---|---|
| 6,189,005 B1 * | 2/2001 | Chakrabarti et al. .................. 1/1 |
| 6,314,392 B1 | 11/2001 | Eberman et al. | |
| 6,718,317 B1 | 4/2004 | Wang et al. | |
| 6,785,663 B2 | 8/2004 | Wang et al. | |
| 6,990,486 B2 | 1/2006 | Ma et al. | |
| 7,200,584 B2 | 4/2007 | Sakurai | |
| 7,254,273 B2 | 8/2007 | Sakanashi et al. | |
| 2004/0024773 A1* | 2/2004 | Stoffel et al. .................. 707/102 |
| 2005/0235356 A1 | 10/2005 | Wang | |
| 2007/0208677 A1 | 9/2007 | Goldberg et al. | |

OTHER PUBLICATIONS

Mannila, H et al "Minimum Description length Block finder, a Method to Identify Haplotype Blocks and to Compare the Strength of Block Boundaries" The American Journal of Human TGenetics, vol. 73, Issue 1, Jul. 2003. p. 86-94. [Online] Downloaded Apr. 7, 2011. http://www.sciencedirect.com/science?_ob=MImg&_imagekey=B8JDD-4RDPT4C-9-10&_cdi=43612&_user=.*

Keogh, Emonn and Padhraic Smyth. "A Probabilistic Approach to Fast Pattern Matching in Time Series Databases" AAAI Technical Report. 1998 p. 52-57 [Online] Downloaded Apr. 7, 2011. https://www.aaai.org/Papers/Workshops/1998/Ws-98-07/WS98-07-009.pdf.*

Grunwald, Peter. "A tutorial Introduction to the Minimum Description Length Principle" MIT Press 2004. [Online] Downloaded Apr. 7, 2011.*

(Continued)

Primary Examiner — Wilbert L. Starks, Jr.
Assistant Examiner — Ben M Rifkin
(74) Attorney, Agent, or Firm — Van N. Nguy

(57) ABSTRACT

The present invention provides a method and system for constructing one or more a comprehensive summaries of event sequence(s). The present invention approaches the problem of finding the shortest yet most comprehensive summary of an event sequence by transforming this summarization problem into a concrete optimization problem and provides a computer-implementing technique for solving this optimization problem to construct and/or form the basis for constructing the summaries. The summaries describe an entire event sequence while at the same time reveal local associations between events of that sequence. In certain embodiments, the segmentation of the event sequence produced in accordance with the present invention is itself a summary of the event sequence. In other embodiments, the segmentation produced forms a basis for one or more summaries.

13 Claims, 7 Drawing Sheets

OTHER PUBLICATIONS

Hyvonen, Saara, Aristides Gionis and Heikki Mannila. "Recurrent Predictive Models for Sequence Segmentation" Springer-Verlag Berlin Heidelberg 2007. [Online] Downloaded Apr. 7, 2011 http://www.springerlink.com/content/03r87247014732n2/fulltext.pdf.*

Foster, Dean and Robert Stine. "Local Asymptotics and minimum Description Length" The Wharton School of the University of Pennsylvania. Mar. 27, 1998. [Online] Downloaded Apr. 7, 2011 http://gosset.wharton.upenn.edu/research/lac.pdf.*

R. Agrawal et al., "Mining Sequential Patterns", Proceedings of the 11th International Conference on Data Engineering, Taipei, Taiwan, Mar. 1995. (32 pages).

J. Allan et al., "Temporal summaries of news topics", SIGIR, Sep. 2001, pp. 10-18.

R. Bellman. "On the approximation of curves by line segments using dynamic programming", Communications of the ACM, vol. 4, No. 6, 1961, p. 284.

C. Bettini et al., "Mining temporal relationships with multiple granularities in time sequences", Data Engineering Bulletin, vol. 21, No. 1, 1998. pp. 32-38.

T. Brants et al., "A system for new event detection", International Conf. on Res. and Dev. in Information Retrieval (SIGIR), Toronto, Canada, Jul.-Aug. 2003, pp. 330-337.

D. Chudova et al., "Pattern Discovery in Sequences under a Markov Assumption", Proc. of ACM SIGKDD International Conference on Knowledge Discovery and Data Mining, Alberta, Canada, 2002, pp. 153-162.

R. Fagin et al., "Multi-structural Databases", Symposium on Principles of Database Systems (PODS), Baltimore, MD, Jun. 2006, pp. 184-195.

S. Guha et al., "Data-streams and histograms", Symposium on the Theory of Computing, (STOC), Crete, Greece, Jul. 2001, pp. 471-475.

K. Julisch, "Clustering Intrusion detection alarms to support root cause analysis", ACM Trans. Inf. Syst. Security, vol. 6, No. 4, Nov. 2003, pp. 443-471.

P. Karras et al., "Exploiting duality in summarization with deterministic guarantees", Proc. ACM SIGKDD International Conference on Knowledge Discovery and Data Mining, San Jose, CA, Aug. 2007, pp. 380-389.

E. Keogh et al., "An online algorithm for segmenting time series", Proc. IEEE International Conference on Data Mining, (ICDM), 2001, pp. 289-296.

P. Kilpelainen et al., "Mdl learning of unions of simple pattern languages from positive examples", Computational Learning Theory: Second European Conference, EuroCOLT '95, Barcelona, Spain, Mar. 1995. Proceedings, pp. 252-260.

J. Kleinberg, "Bursty and hierarchical structure in streams", Data Mining and Knowledge Discovery, vol. 7, 2003, pp. 373-397.

M. Kovisto et al., "An MDL method for finding haplotype blocks and for estimating the strength of haplotype block boundaries", Pacific Symposium on Biocomputing, 2003, pp. 502-513.

W. Lee et al., "Mining System audit data: Opportunities and challenges", SIGMOD Record, vol. 30, #4, 2001, pp. 35-44.

H. Mannila et al., "Finding simple intensity descriptions from event sequence data", Proc. ACM SIGKDD International Conference on Knowledge Discovery and Data Mining (KDD), 2001, pp. 341-346.

H. Mannila et al., "Discovering generalized episodes using minimal occurrence", Proc. ACM SIGKDD, International Conference on Knowledge Discovery and Data Mining (KDD), 1996, pp. 146-151.

M. Mehta et al., "Mdl-based decision tree pruning", KDD, 1995, pp. 216-221.

S. Papadimitriou et al., "Streaming pattern discovery in multiple time-series", Proc. of Very Large Data Bases (VLDB) Conference, 2005, pp. 697-708.

S. Papadimitriou et al., "Optimal multi-scale patterns in time series streams", Proc. of ACM SIGMOD International Conference on Management of Data, 2006, pp. 647-658.

Y. Sakurai et al., "Braid: Stream mining through group lag correlations", Proc. of ACM SIGMOD Intl. Conf. on Mgmt. of Data, 2005, pp. 599-610.

S. Stolfo et al., "A temporal based forensic analysis of electronic communication", DG.O, 2006, pp. 23-24.

S. Stolfo et al., "Data mining-based intrusion detectors: An overview of the columbia ids project", SIGMOD Record, vol. 30, No. 4, 2001, pp. 5-14.

R. Swan et al., "Automatic generation of overview timelines", SIGIR, 2000, pp. 49-66.

E. Terzi et al., "Efficient algorithms for sequence segmentation", SIAM Intl. Conf. on Data Mining (SDM), 2006, pp. 314-325.

J. Yang et al., "Mining long sequencial patterns in a noisy environment", Proc. of ACM SIGMOD Int. Conf. on Mgmt. of Data, 2002, pp. 406-417.

Y. Yang et al., "Improving text categorization methods for event tracking", Proc. of international Conf. on Res. and Dev. in Inf. Retrieval (SIGIR), 2000, pp. 65-72.

Y. Zhu et al., "Statstream: Statistical monitoring of thousands of data streams in real time", Proc. Very Large Data Bases (VLDB) Conference, 2002, pp. 356-369.

J. Rissanen, "Stochastic Complexity in Statistical Inquiry Theory", World Scientific Publishing Company, Inc., River Edge, N.J., USA 1969.

A. Marascu et al., "Mining Sequential patterns from data streams: a centroid approach", Journal of Int. Inf. Systems: Integrating Art. Int. and Database Tech., vol. 27, No. 3, Nov. 2006. pp.291-307.

Mannilla et al., "Similarity of event Sequences", Temporal Rep. and Reasoning, 1997, (TIME '97), Proc. of Fourth Int. Workshop, May 10-11, 1997, pp. 136-139.

J. Rissanen, "Modeling by shortest data description", Automatica, vol. 14, 1978, pp. 465-471.

J. Pei et al., "Contraint-based sequential pattern mining: the pattern-growth methods", Journal of Intell. Inf. Systems, vol. 28, No. 2, 2007, pp. 133-160.

J. Quinlan et al. "Inferring decision trees using the minimum description length principle", Inf. Computing, vol. 80, No. 3, 1989, pp. 227-248.

* cited by examiner

FIGURE 2

| | A | B | C |
|---|---|---|---|
| | 1 | 1 | |
| | 1 | 1 | |
| | 1 | 1 | |
| | | 1 | |
| | 1 | 1 | |
| | | | 1 |
| | | | |
| | 1 | 1 | |
| | 1 | 1 | |
| | 1 | 1 | |
| | 1 | | |
| | 1 | | |
| | 1 | 1 | |
| | | 1 | 1 |
| | | 1 | 1 |
| | | 1 | 1 |
| | 1 | 1 | 1 |
| | | 1 | 1 |
| | | 1 | 1 |
| | 1 | | |
| | | 1 | 1 |
| | | 1 | 1 |
| | 1 | 1 | 1 |
| | 1 | | 1 |
| | | | 1 |
| | 1 | 1 | 1 |
| | 1 | | 1 |
| | 1 | | 1 |
| | 1 | | |
| | 1 | | 1 |
| | 1 | | 1 |
| | 1 | | 1 |
| | | | |

200

__US 8,027,949 B2__

CONSTRUCTING A COMPREHENSIVE SUMMARY OF AN EVENT SEQUENCE

FIELD OF THE INVENTION

The present invention relates to event sequence data and in particular to constructing a comprehensive summary of an event sequence.

BACKGROUND

Log data records systems' or users' activities through time. Large volumes of log data are often managed by database systems. In log data, every tuple (i.e., an ordered set of data) corresponds to a logged event and every event is associated with a timestamp that specifies the event's time of occurrence. We use the term "event sequences" to characterize this data. The set of unique tuples formed by ignoring the occurrence times of the logged events defines a set of different "event types".

Summarization and analysis of event sequences can provide useful insights in forensic investigation. However, when attempting to review activity for forensic investigation, the volume of information in the event sequences can be overwhelming. Standard SQL methodology is generally inadequate for such complex, large-scale data-analysis tasks. Other work on event sequence mining, including off-the-shelf event sequence data-mining software, has focused on discovering local patterns based on known constraints. The constraints are typically provided by a data analyst as parameters to those mining methods. Those methods find recurring local structures based on the predefined constraints (e.g., episodes of more than three consecutive failed attempts to access a computer system), but fail to provide a global model of the data and fail to give a comprehensive summary of an entire event sequence. Furthermore, those data mining methods tend to discover a prohibitively large number of local patterns since they provide all possible local patterns that satisfy a predefined constraint. This can overwhelm data analysts with too many local patterns to be useful for spotting general activity trends and/or for pinpointing specific suspicious actions. This causes the data analyst to have to adjust parameters iteratively in an attempt to determine general activity trends and/or suspicious actions.

BRIEF SUMMARY OF THE INVENTION

Embodiments of the present invention provide a computer implemented Minimum Description Length (MDL) based method for constructing a summary of an event sequence S, the method balancing between over-generalizing and over-fitting descriptions of the event sequence S, the method including receiving an event sequence S identifying events of different event types occurring over a time interval; segmenting the event sequence S into segments $(S_1, \ldots, S_k)$, wherein k is an integer, wherein the segmenting partitions the time interval into contiguous, non-overlapping intervals, wherein the segmenting minimizing a total cost $T_L(S,M)$ in bits for describing the event sequence S, wherein the total cost $T_L(S,M)$ in bits consists of a number of bits used to identify segment boundaries segmenting the event sequence S into segments $(S_1, \ldots, S_k)$ and a total local cost $L_L(S_i,M_i)$ in bits for describing each segment, wherein the total local costs $L_L(S_i, M_i)$ in bits consists of a number of bits used to identify a local model $M_i$ and a number of bits used to describe the corresponding segment $S_i$ using the local model $M_i$, and wherein each local model $M_i$ groups one or more events of one or more events types within the corresponding segment $S_i$ into one or more groups based on a frequency of occurrence of the events; and outputting a summary for the event sequence S, the summary indicating the segments $(S_1, \ldots, S_k)$ and the groups. The segmenting may include (a) identifying a segmental grouping $M^t$, wherein initially t is 1 and $M^1$ has k+1 segment boundaries and wherein, for $M^1$, each event of the event sequence S is in a different segment; (b) removing boundaries recursively in the segmental grouping $M^t$ until at a t-th recursion, a boundary b is identified in the segmental grouping $M^t$ which removal causes a maximum decrease in $T_L(S,M^t)$; and (c) if no boundary causes a decrease in $T_L(S, M^t)$, outputting $M^t$. The event sequence S may identify at least one thousand events. The events may be of at least three different event types.

Embodiments of the present invention also provide a computer program product for constructing, based on Minimum Description Length, a summary of an event sequence S, the computer program product including: a computer usable medium having computer usable program code embodied therewith, the computer usable program code including computer usable program code configured to receive an event sequence S identifying events of different event types occurring over a time interval; computer usable program code configured to segment the event sequence S into segments $(S_1, \ldots, S_k)$, wherein k is an integer, wherein the segmenting partitions the time interval into contiguous, non-overlapping intervals, wherein the segmenting minimizing a total cost $T_L(S,M)$ in bits for describing the event sequence S, wherein the total cost $T_L(S,M)$ in bits consists of a number of bits used to identify segment boundaries segmenting the event sequence S into segments $(S_1, \ldots, S_k)$ and a total local cost $L_L(S_i,M_i)$ in bits for describing each segment, wherein the total local costs $L_L(S_i,M_i)$ in bits consists of a number of bits used to identify a local model $M_i$ and a number of bits used to describe the corresponding segment $S_i$ using the local model $M_i$, and wherein each local model $M_i$ groups one or more events of one or more events types within the corresponding segment $S_i$ into one or more groups based on a frequency of occurrence of the events; and computer usable program code configured to output a summary for the event sequence S, the summary indicating the segments $(S_1, \ldots, S_k)$ and the groups.

Embodiments of the present invention also provide a system for constructing a summary of an event sequence S, the system including a database system storing an event sequence S; memory storing computer usable program code; and a processor coupled to the data system to receive the event sequence S from the database system and coupled to the memory to execute the computer usable program code stored on the memory; wherein the computer usable program code including computer usable program code configured to receive an event sequence S identifying events of different event types occurring over a time interval; computer usable program code configured to segment the event sequence S into segments $(S_1, \ldots, S_k)$, wherein k is an integer, wherein the segmenting partitions the time interval into contiguous, non-overlapping intervals, wherein the segmenting minimizing a total cost $T_L(S,M)$ in bits for describing the event sequence S, wherein the total cost $T_L(S,M)$ in bits consists of a number of bits used to identify segment boundaries segmenting the event sequence S into segments $(S_1, \ldots, S_k)$ and a total local cost $L_L(S_i,M_i)$ in bits for describing each segment, wherein the total local costs $L_L(S_i,M_i)$ in bits consists of a number of bits used to identify a local model $M_i$ and a number of bits used to describe the corresponding segment $S_i$ using the local model $M_i$, and wherein each local model $M_i$ groups one or more events of one or more events types within the corresponding segment $S_i$ into one or more groups based on a frequency of occurrence of the events; and computer usable program code configured to output a summary for the event sequence S, the summary indicating the segments $(S_1, \ldots, S_k)$ and the groups.

BRIEF DESCRIPTION OF THE SEVERAL VIEWS OF THE DRAWINGS

The invention is further described by way of example with reference to the accompanying drawings wherein:

FIG. 2 is a representation of the event sequence of FIGS. 1A-1C as an array;

DETAILED DESCRIPTION OF THE INVENTION

Figure 1A:
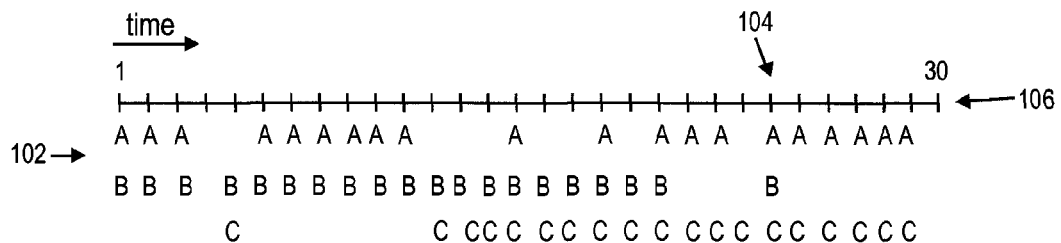
FIGS. 1A-1C are visual representations providing an example of an input event sequence and an output for the input event sequence in accordance the present invention.

The present invention provides a method and system for constructing one or more a comprehensive summaries of event sequence(s). By a comprehensive summary, we mean a summary that covers a wide scope. The summaries of the present invention are also short, even when the event sequences are large including, e.g., event sequences having thousands to billions of events. The present invention approaches the problem of finding the shortest yet most comprehensive summary of an event sequence by transforming this summarization problem into a concrete optimization problem and provides a computer-implementing technique for solving this optimization problem to construct and/or form the basis for constructing the summaries. The summaries describe an entire event sequence while at the same time reveal local associations between events of that sequence. In certain embodiments, the segmentation of the event sequence produced in accordance with the present invention is itself a summary of the event sequence. In other embodiments, the segmentation produced forms a basis for one or more summaries. We conducted extensive experiments on both synthetic and real datasets to show that the present invention is efficient and produces high-quality results that enable data analysts to gain insight into large volumes of event sequences based on the summaries.

More specifically, the present invention approaches the summarization problem as an optimization problem that balances between (1) shortness of the summary (or summary length) and (2) accuracy of the data description (or description accuracy). The Minimum Description Length (MDL) principle is used in the problem definition to allow for parameter-free and domain-independent methods. Our usage of MDL penalizes both complex models that over-fit the data being summarized as well as simple models that over-generalize the data being summarized thereby enabling the identification of the most specific, general summary of the data. Accordingly, the methodology of the present invention is parameter-free, which increases its practical utility (because, for example, unlike other techniques, a data analyst using the methodology of the present invention is does not have to iteratively enter parameters in a trial-and-error fashion before gaining insight into general activity trends and/or specific suspicious actions).

The present invention segments the event sequence, identifying global intervals on the timeline to provide a high level view of the event sequence. The events within each interval in the segmented timeline exhibit local regularity. Each interval in the segmented timeline is described by a local model. The local model groups event types with similar rates of appearance within the interval. In this way local associations among event types are captured. Using this approach, the present invention is able to produce short summaries while also revealing interesting local structures in the data, and is effective with both large and small volumes of event sequence data. The criterion that distinguishes between a good or better summary and a less favorable or bad summary is defined by a novel optimization function we developed. The solution to this optimization function identifies the cost (in bits) of various segmentations given certain local models of the data within each segment and given a global model of the event sequence as segmented.

In exemplary embodiments of the present invention, a computer determines a solution to the summarization problem optimally in polynomial time using novel algorithms we developed. As used herein, the term "algorithm" refers to a set of instructions for solving a problem, specifically on a computer. As used herein, the term "algorithmic method" refers to a method applying said set of instructions. As described in more detail below, four different novel algorithmic methods (in combinations of two) are provided to solve the dual issue involved in finding the minimum number bits to describe the event sequence: (i) identifying optimal locations for segment boundaries on the event sequence timeline and (ii) identifying optimal local models for each segment created by the segment boundaries. To address the first issue, we developed two different novel algorithmic methods: Segment-DP and Greedy. To address the second issue, we also developed two different novel algorithmic methods: Local-DP and LocalGreedy. Segment-DP and Local-DP are both dynamic programming methods. Greedy and LocalGreedy are both greedy methods. Accordingly, an embodiment of the present invention uses Segment-DP in combination with Local-DP; another embodiment uses Segment-DP in combination with Local-Greedy; another embodiment uses Greedy in combination with Local-DP; and yet another embodiment uses Greedy in combination with LocalGreedy.

One exemplary embodiment of our invention provides for all four of the following properties, which are often useful for forensic investigations and other data-analysis tasks: (1) parameter free: the summarization method of the exemplary embodiment provides informative and useful results without extra tuning by an analyst; (2) global data description: the summaries of the exemplary embodiment of the present invention give an indication of the global structure of the event sequence and its evolution through time (overall systems' and users' usage patterns can, for example, be reviewed for forensic investigation to identify anomalies at a global level, or simply to gain insights into global usage patterns); (3) local pattern identification: a summary of the exemplary embodiment of the present invention reveals information about local patterns—normal or suspicious events or combination of events that occur at certain points in time can be identified by just looking at the summary; and (4) brevity and accuracy: the summarization system of the exemplary embodiment constructs short summaries that accurately describe the input data—ineither over-fitting the data for the sake of accuracy and the expense of brevity, nor over-generalizing for the sake of brevity but at the expense of accuracy are desirable.

Figure 1B:
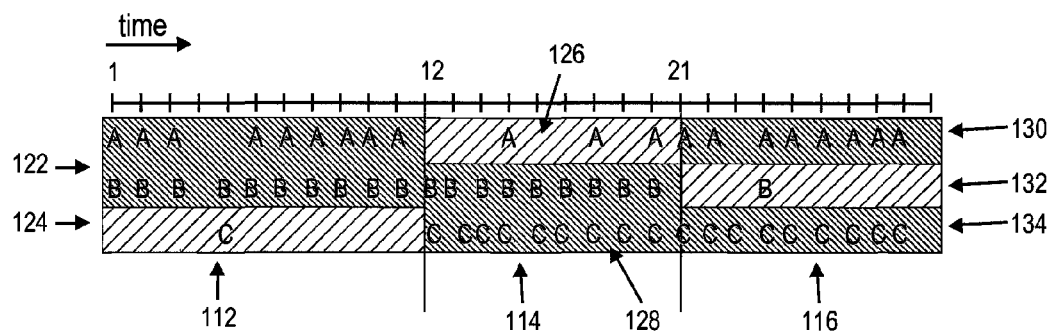
Figure 1C:
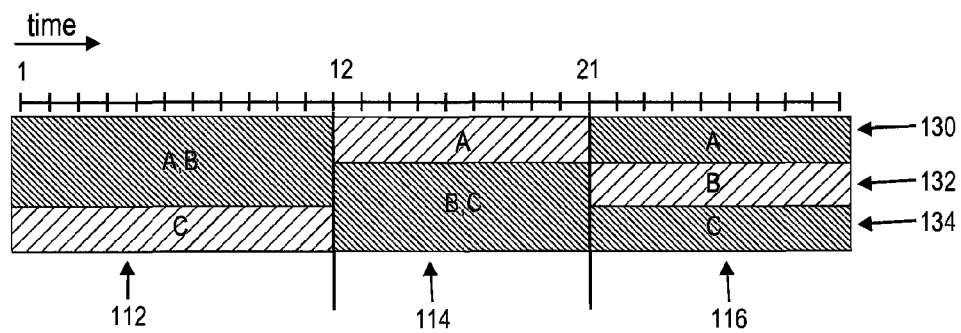

FIGS. 1A-1C are visual representations providing an example of an input event sequence and an output for the input event sequence in accordance the present invention. The input event sequence 102 contains events of three event types {A,B,C} and spans timeline [1,30]. In use, the events of the input event sequence 102 may be, for example, events from an application log containing events (e.g., file errors) logged by programs. The events of the input event sequence may be, as another example, events from a security log that records events (e.g., valid and invalid logon attempts or events related to resource use, such as the creating, opening, or deleting of files). The events of the input event sequence may be, as yet another example, events from a system log that contains events logged by an operating system component (e.g., the event of a driver failing to load during startup).

In FIG. 1A, the example input event sequence contains the three event types {A,B,C} and spans a timeline [1,30] that consists of 30 discrete timestamps (identified in FIG. 1A by hash marks 104 on the timeline 106). The granularity of the timeline 106 depends on the events being recorded. For example, in some applications, the timeline marks milliseconds. In others applications, the timeline marks years. In this example, the timeline is discrete, so that occurrence times of events are positive integers in the interval [1,n]. That is, the timeline consists of n different evenly spaced timestamps at which events of different types might occur. Significantly, some timestamps along the timeline have no events. Thus, as can be understood from FIG. 1A, in contrast to other works which deals with time series data, the present invention deals with event sequence data.

Time series data is continuous, having a real value at each measured point in time (e.g., a temperature value at each second). In contrast, event sequence data, which this invention addresses, is discrete. With event sequence data, while a timestamp is associated with each event, a real value does not exist at each point in time. So, for example, an event in event sequence data may a death. As a further example, in FIG. 1A, each event of event type A may be a report of a birth in a city, each event of event type B may be a report of a major illness in the city, and each event of event type C may be a report of a death in the city. As another example, in FIG. 1A, each event of event type A may be a withdrawal from an ATM, each event of event type B may be a deposit to an ATM, and each event of event type C may be a report of fraudulent account activity.

In the above scenarios, events of different types are generated at every distinct timestamp independently with some stationary probability that depends on the event type and the segment itself. Thus, as can be readily understood from the above, the properties of event sequence data differ significantly from time series data. Techniques that may succeed in extracting useful information from time series data often do not succeed in extracting useful information from event sequence data, and vice versa. For example, the complexity of computations dealing with event sequence data depends not on the total length of the timeline n, but rather on the number of timestamps at which events actually occur, in contrast to computations dealing with time series data. The present invention provides information on event sequence data.

FIG. 1B shows the segmental grouping of the event sequence 102 shown in FIG. 1A according to the present invention. In FIG. 1B, three segments 112, 114, 116 are identified. The segment 112 runs from time 1 to time 11 (i.e., [1,11]); the segment 114 runs from time 12 to time 20 (i.e., [12,20]); and the segment 116 runs from time 21 to time 30 (i.e., [21,30]). Within each segment the events are grouped (e.g., into two groups—the groups 122 and 124 in the segment 112, or 126 and 128 in the segment 114; or into three groups—the groups 130, 132, and 134 in the segment 116). As seen in FIG. 1B, event types with similar frequency of appearance within a segment are grouped together. For example, in the segment 112, the event types A and B are grouped together into the group 122, while the event type C, which occurs only once in the segment, is grouped separately into the group 124.

FIG. 1C shows a high-level view of a summary of the event sequence according to the present invention. FIG. 1C shows what one output of the summarization method of the present invention can look like for the example input event sequence 102. The fill pattern of the groups within a segment is indicative of the probability of appearance of the events in the group—a darker fill pattern corresponds to a higher occurrence probability. For example, in the segment 116, the groups 130 and 134 appear in the same fill pattern, which is darker than the fill pattern of the group 132. This indicates that the probability of event appearances in the groups 130 and 134 are substantially the same, and that both probabilities are higher than the probability of event appearances in the group 132.

The following describes in further technical detail embodiments of the present invention, leveraging the example of FIGS. 1A-1C to provide a more thorough understanding.

In our approach, S is defined to be an event sequence that records occurrences of events over a time interval [1,n]. Event sequences consist of events that occur at specific points in time. That is, every event in the sequence has an associated time of occurrence. For example, each instance of A, B, and C shown in FIG. 1A is an event which occurs at the time under which it is shown. For example, in FIG. 1A, the first instance of A at the top-left is an event that occurs at time 1. The second instance of A that occurs next to the first instance is a different event that occurs at time 2. The first instance of B is yet another event (this time of event type B) and occurs at time 1, like the first instance of A. The second instance of B is still another event that which occurs at time 2. Accordingly, in application, S may be the event sequence shown in FIG. 1A consisting of the occurrences of each instance of A, B, and C at specific points in time over the time interval [1,30].

Further, in our approach, we define a set $\epsilon$ to be the set of distinct event types (e.g., A, B, or C) that appear in the sequence. In other words, a set $\epsilon$ consists of m different event types (e.g., m=3 for the different event types A, B, and C). An event is a pair (E,t), where E, an element of the set $\epsilon$ (i.e., E$\in\epsilon$), is an event type and t is the occurrence time of the event on a timeline. So FIG. 1A can be understood as showing an event sequence S on which events of m=3 different types appear and $\epsilon$={A, B, C}. The events occur on the timeline [1,30] (so, n=30). That is, there are 30 timestamps at which any of the three event types may (but do not necessarily) occur.

The event sequence S can be represented by an m×n array such that S(i,t)=1 if an event of type $E_i$ has occurred at time point t. FIG. 2 is a representation of the event sequence of FIGS. 1A-1C as an array 200. In FIG. 2, the array 200 is a 3×30 array. The first row of the array corresponds to events of event type A, the second row events of event type B, and the third row events of event type C. At a certain time t, events of different types can occur simultaneously. That is, each column of the array representing S can have more than one "1" entry. However, at any time t, only one event of each type can occur. (If multiple events of the same type do occur at a point t, either they can be ignored as duplicates, or the granularity of the timeline can be made finer if it is too coarse).

The present invention partitions an interval being observed (the observation interval) into segments of local activity that span the timeline while simultaneously within each segment (e.g., 112, 114, 116) identifying groups (e.g., 122, 124) of event types (e.g., A, B, and C) that exhibit similar frequency of occurrence in the segment. We use the term "segmental grouping" to describe this data-description model. Thus, for a given observation interval I which is a subset of or equal to the timeline (i.e., $I \subset [1,n]$), we use S[I] to denote the m×|I| projection of S on the interval I. Accordingly, for event type $E \in \overline{E}$ and interval $I \subset [1,n]$ we denote the number of occurrences of events of type $\overline{E}$ within the interval I by n(E,I).

The invention finds a segmentation of the input timeline [1,n] that divides the timeline into contiguous, non-overlapping intervals (called "segments") that cover the timeline. For example, as discussed above, in FIG. 1B, the three contiguous, non-overlapping intervals are segments 112, 114, and 116. As can be seen in FIG. 1B, the boundaries of segments 112, 114, and 116 are {1,12,21,31}. More technically, this can be described by saying that a segmentation is defined by k+1 boundaries $\{b_1, b_2, \ldots, b_k, b_{k+1}\}$ where $b_1=1$, $b_{k+1}=n+1$ and each $b_j$, with $2 \leq j \leq k$, takes integer values in [2,n], and so there are k segments of S (so $S=(S_1, \ldots, S_k)$). Accordingly, in the example of FIG. 1B, there are k+1 (or 4) boundaries (or {1, 12, 21, and 31}), where $b_1=1$, $b_{k+1}=n+1$ (or $b_{k+1}=30+1=31$) and each $b_j$, with $2 \leq j \leq 30$ takes integer values in [2,30].

Taking a specific segment $S_i$ defined over a time interval I (i.e., $S_i=S[I]$), the portion of the data that corresponds to $S_i$ is described by a local model $M_i$. The local model $M_i$ is a partitioning of event types E into groups $\{X_{i1}, \ldots, X_{ij}\}$ such that each group $X_{ij}$ is a subset or equal to the set E (i.e., $X_{ij} \subset E$ and $X_{ij} \cap X_{ij'} = \emptyset$ for every $j \neq j'$ with $1 \leq j, j' \leq l$). Each group $\overline{X_{ij}}$ is described by a single parameter $p(X_{ij})$ that corresponds to the probability of seeing an event of any type in $X_{ij}$ within data segment $S_i$.

Consider for example the segment 112 of FIG. 1B that identifies interval $I_1=[1,11]$, with length $|I_1|=11$. In this case the local model $M_1$ that describes the data in $S_1=S[I_1]$ partitions E into groups $X_{11}=\{A,B\}$ (i.e., the group 122) and $X_{12}=\{C\}$ (i.e., the group 124) with $$p(X_{11}) = \frac{1}{2} \frac{n(A, I_1) + n(B, I_1)}{|I_1|} = \frac{19}{22};$$

and $$p(X_{12}) = \frac{n(C, I_1)}{|I_1|} = \frac{1}{11}.$$

That is, the probability of seeing an event of any type within the group 122 is 19/22 and the probability of seeing an event of any type within the group 124 is 1/11.

Leveraging upon the notations above, the following describes the technique by which the present invention identifies the set of boundaries on the timeline that partitions the event sequence S into segments $(S_1, \ldots, S_k)$ and identifies a local model $M_i$ that describes the data within each segment $S_i$. The partitioning of S into segments $(S_1, \ldots, S_k)$ and the corresponding local models $(M_1, \ldots, M_k)$ constitutes the segmental grouping of the event sequence S. In use, this segmental grouping provides (by itself or by forming a basis for) a short yet comprehensive summary of the event sequence S.

As discussed above, the present invention finds the segmental groupings solving an optimization problem which penalizes (and thus balances between) complex models (that over-fit the data) and simple models (that over-generalize the data). The present invention uses the MDL principle to transform the requirement of balance between over-generalizing and over-fitting into a computational requirement. The MDL principle can be further understood by reference to FIG. 3.

Figure 3:
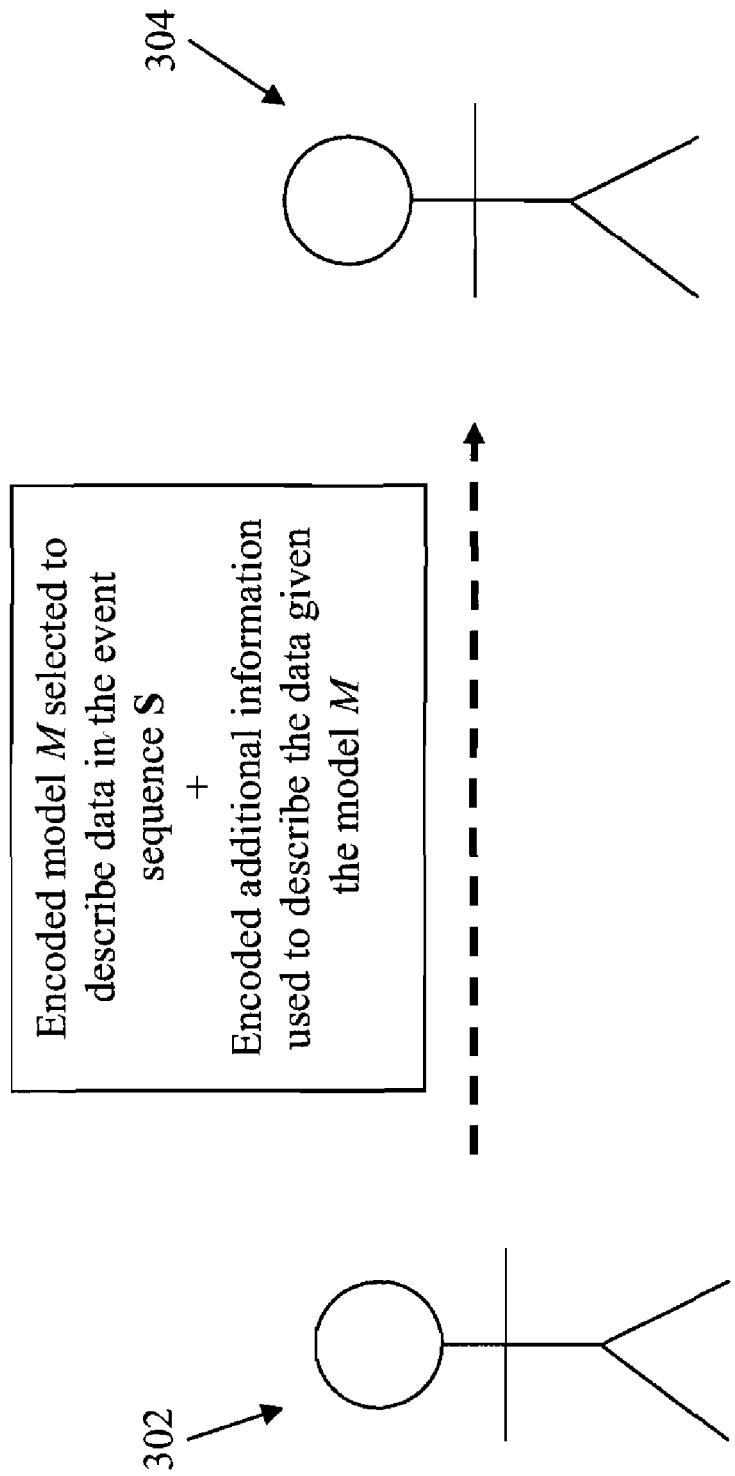
FIG. 3 is an illustration of a scenario.

In FIG. 3, a party 302 wants to communicate with a party 304. The party 302 wants to send an event sequence S to the party 304 using as few bits as possible. For the party 302 to achieve this minimization of communication cost, the party 302 selects a model M from a class of models, and uses the selected model M to describe the data of event sequence S. The party 302 sends to the party 304 the model M plus additional information used to describe the data given the model M. The party 302 encodes both the model M and the additional information. The quality of the selected model is evaluated based on the number of bits required for this overall encoding of the model and the additional information given the model. The lower the number of bits for this overall encoding the better. A simple model takes fewer bits to encode, but the amount of additional information used to describe the data given the simple model is higher. A more complex model may take more bits to encode, but then the amount of additional information used to describe the data given the more complex model is lower. Accordingly, MDL discourages both simple models with large data costs and complex models with minimal data cost. MDL finds a balance between these two extremes.

TOTAL ENCODING COST $T_L(S,M)$: Recall that the present invention describes event sequences using a segmentation technique that partitions the input observation interval [1,n] into contiguous, non-overlapping intervals $I_1, \ldots, I_k$. Therefore, an event sequence S is split into segments $(S_1, \ldots, S_k)$, where $S_i=S[I_i]$. The total cost of describing the event sequence S is the total local encoding cost plus the cost of encoding information based on a global view of the event sequence (or the global encoding cost). The following first discusses the local encoding cost and then the global encoding cost.

Local encoding cost $L_L(S_i,M_i)$: The data in each segment $S_i$ are described by a local model $M_i$. The local model groups the event types based on their frequency of appearance in a segment $S_i$. The total local cost in bits for describing segment $S_i$ is the number of bits used to describe the model $M_i$ itself plus the number of bits used to describe the segment $S_i$ using the model $M_i$. This can be expressed more succinctly as follows:

$$L_L(S_i,M_i)=L_M(M_i)+L_D(S_i|M_i)$$

First, we describe the procedure that identifies the local data cost $L_D(S_i|M_i)$, i.e., the number of bits used to encode the data within a single segment $S_i$ defined by a time interval I where $S_i=S[I]$. Then we describe the procedure that identifies the local model cost $L_M(M_i)$, i.e., the number of bits used to encode the model $M_i$ itself.

(a) Local data cost $L_D(S_i|M_i)$: The present invention uses a model $M_i$ that partitions rows of $S_i$ (which correspond to events of all types, present or not in $S_i$) into l groups $X_i, \ldots, X_l$. As discussed above, each group $X_j$ is described by a single parameter $p(X_j)$ which is the probability of appearance of any event type in $X_j$ within the segment $S_i$. Given the $X_j$'s, and corresponding $p(X_j)$'s for $1 \leq j \leq l$, and given independence of occurrences of events and event types, the present technique finds the probability of data in $S_i$ given model $M_i$ (or $Pr(S_i|M_i)$) by:

$$Pr(S_i \mid M_i) = \prod_{j=1}^{l} \prod_{E \in X_j} p(X_j)^{n(E,I)} (1 - p(X_j))^{|I|-n(E,I)}$$

Since the number of bits required to encode an event with probability q is $-\log(q)$, the number of bits to describe data $S_i$ given model $M_i$ is $-\log(Pr(S_i|M_i))$. Therefore, the number of bits to describe data in $S_i$ given model $M_i$ (i.e., the local data cost to describe data in $S_i$ given model $M_i$ (i.e., $L_D(S_i|M_i)$) is $$L_D(S_i \mid M_i) = -\log(Pr(S_i \mid M_i))$$

$$= -\sum_{j=1}^{l} \sum_{E \in X_j} (n(E, I)\log p(X_j) + (|I| - n(E, I))\log(1 - p(X_j)))$$

(b) Local model cost $L_M(M_i)$: Now we describe the procedure that identifies the number of bits used to encode the model $M_i$ itself. To encode the model $M_i$, our technique defines the event types associated with every group $X_j$ (where $1 \leq j \leq l$). For each group $X_j$, the technique specifies a parameter $p(X_j)$, the probability of appearance of any event type in $X_j$ within the segment $S_i$. To encode the l different probabilities $p(X_j)$'s, $\log(m)$ bits are used to describe each one of the $p(X_j)$'s. Therefore, the present invention uses a total of l $\log(m)$ bits to encode the l different $p(X_j)$'s. The technique also encodes the partitioning as part of the encoding of the model $M_i$.

By fixing an ordering of the event types to be consistent with the partitioning $X_1, \ldots, X_l$, the partition points are integers in the range $[1,m]$. Accordingly, since $\log(m)$ bits describe each partition point, the technique uses l $\log(m)$ bits to identify the l partition points on that fixed order. The technique also uses m $\log(m)$ bits to specify the ordering. Summing up these costs, we see that the present technique uses a local model cost for $M_i$ of $$L_M(M_i) = 2l \log(m) + m \log(m).$$

In the local encoding method described above, events of different types within a segment $S_i$ are generated independently. That is, for each event type $E \in X_j$, with $1 \leq j \leq l$, an event of type E is generated at every time point $t \in I$ independently with probability $p(X_j)$.

Global encoding cost $G_L$: The global model of the present invention is the segmental model M that splits S into segments $S_1, \ldots, S_k$ where each segment is specified by its boundaries and the corresponding local model $M_i$. When, for every segment $S_i$, the data in $S_i$ is described using the local encoding method described above, the present invention provides a global description by additionally encoding the positions of the segment boundaries that define the starting points of the segments on timeline $[1;n]$. With n possible boundary positions, k segment boundaries are encoded using k $\log(n)$ bits.

Total: Accordingly, the present invention provides a global description of data in the event sequence using the following number of bits.

$$T_L(S, M) = G_L + \sum_{i=1}^{k} L_L(S_i, M_i)$$

$$= k\log n + \sum_{i=1}^{k} (L_D(S_i \mid M_i) + L_M(M_i))$$

$$= k\log n + \sum_{i=1}^{k} (L_D(S_i \mid M_i) + 2l\log m + m\log m)$$

This value is also referred to herein as the total length of the description, or the total description length. The present invention provides a short, comprehensive summary of an event sequence by using the above total description length, computing a solution that minimizes that length. This can also described as: Given event sequence S over observation period $[1;n]$ in which event types from set $\epsilon$ occur, find integer k and a segmental grouping M of S into $(S_1, \ldots, S_k)$ and identify the best local model $M_i$ for each $S_i$ such that the total description length $$T_L(S_i, M_i) = k\log(n) + \sum_{i=1}^{k} L_L(S_i, M_i)$$

is minimized. Herein, we use $L_L^*(S_i)$ to denote the minimum value of $L_L(S_i,M_i)$ over the possible local models $M_i$. We use $T_L^*(S)$ to denote the minimum value of $T_L(S,M)$ over the possible summaries of M.

Since our approach forms the function above using the MDL principle, the function is such that: (a) complex summaries are penalized because they over-fit the data and (b) simple summaries are also penalized since they over-generalize and fail to describe the data with the desired accuracy. Therefore, the segmentation that minimizes the function above has the right number of segments, and the right number of groups per segment, so that it avoids both over-fitting and over-generalizing. Moreover, because using the MDL principle allows for a formulation that is parameter-free, no parameter setting is required from an analyst who is attempting to extract knowledge from the input event sequence S.

Global Models: In the description below, for ease of understanding, techniques for determining the segmental grouping in accordance with the present invention is described without identifying a local model that minimizes the local cost—the local model is considered a black box. Following this description, we then describe how to find local models that may be used in certain embodiments.

(a) Segment-DP: One embodiment of the present invention calculates the minimum solution to $$T_L(S_i, M_i) = k\log(n) + \sum_{i=1}^{k} L_L(S_i, M_i)$$

in polynomial time. In one embodiment, the invention uses a dynamic-programming method we developed, called Segment-DP, to calculate $T_L^*(S)$. In such embodiment, for any interval $I \subset [1,n]$, $L_L(S[I])$ is equal to the $\min_{M_i} L_L(S[I],M_i)$, and $T_L^*(\overline{S})$ is determined optimally by evaluating the following dynamic-programming recursion for every $1 \leq i \leq n$, $$T_L^*(S) = \min_{1 \leq j \leq i} \{T_L * (S[1, j]) + L_L * (S[j+1, i])\}$$

When $T_L$ is the time to evaluate $L_L(S[I])$, running of the Segment-DP method takes a time $O(n^2 T_L)$. In use, not all points on the interval $[1,n]$ qualify to be segment boundaries in the optimal segmentation. Rather, only the timestamps on which an event (of any type) occurs are candidate segment boundaries. Therefore, since the recursion does not have to go through all the points $\{1, \ldots, n\}$ but instead just those points on which events actually occur. In use, the time to evaluate $L_L(S[I])$ is faster than $O(n^2 T_L)$; it is $O(|T|^2 T_L)$, where $|T| \leq n$.

Figure 4:
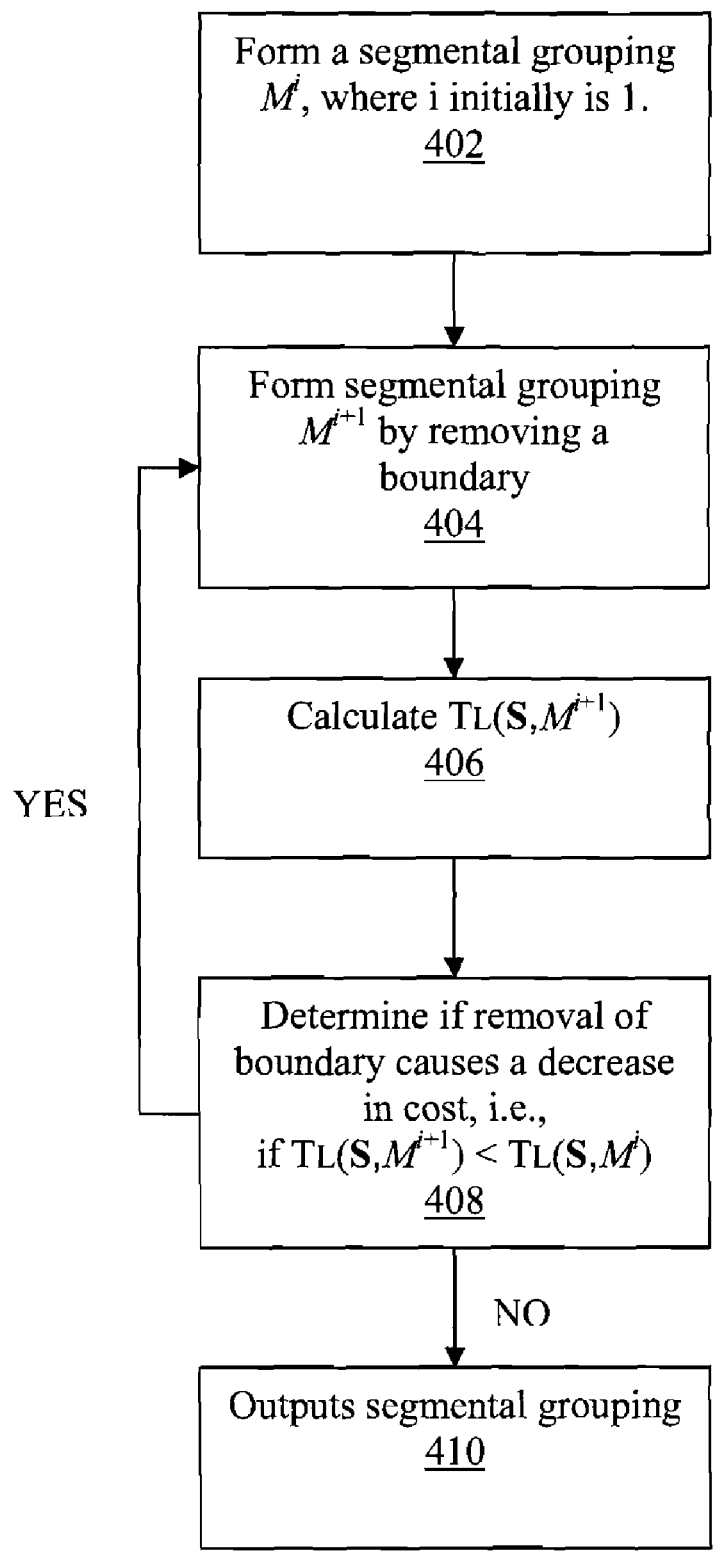
FIG. 4 is a flow chart illustrating a computer implemented method in accordance with the present invention which uses a greedy method.
Figure 5A:
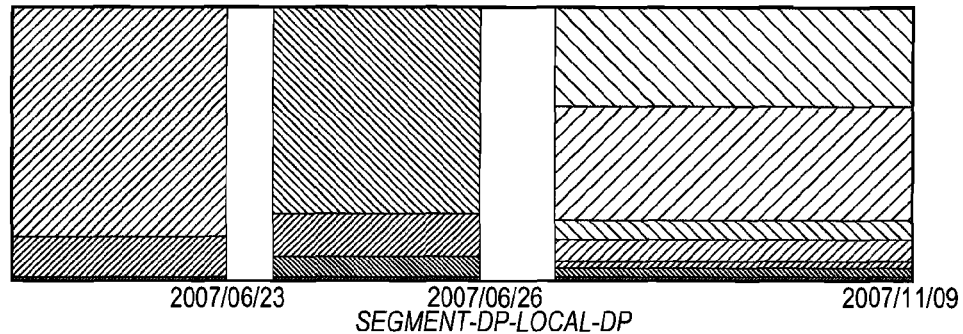
FIG. 5 shows sample segmental groupings outputted in accordance with embodiments of the present invention.
Figure 5B:
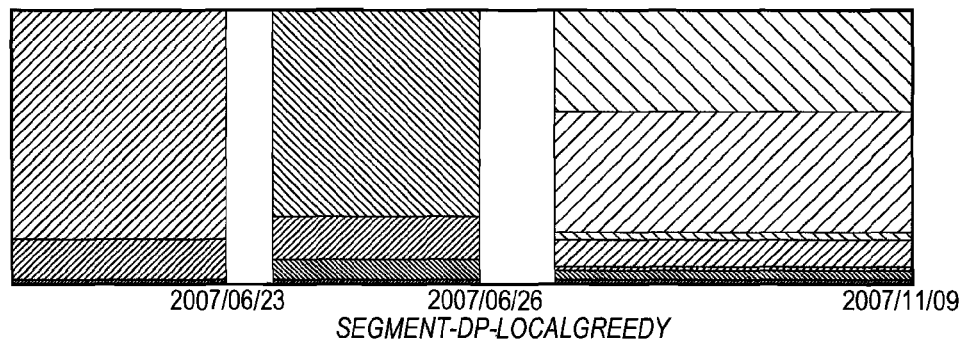
Figure 5C:
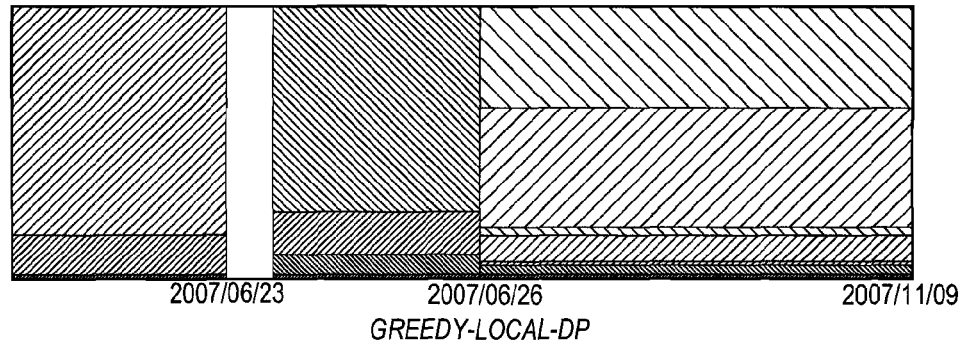
Figure 5D:
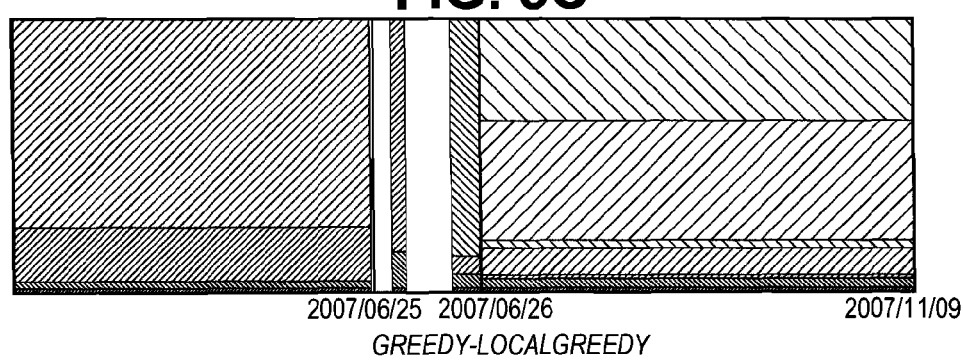

(b) Greedy: FIG. 4 is a flow chart illustrating a computer implemented method in accordance with the present invention which uses a greedy method we developed, herein called Greedy, as an alternative to the Segment-DP method, to calculate $T_L^*(S)$. In an embodiment using the Greedy method, the computer implemented method computes a segmental grouping M of the input event sequence S in a bottom-up fashion. At 402, the method forms a segmental grouping $M^1$ (i.e., $M^i$, where i=1). In the segmental grouping $M^1$, each data point in the input event sequence S is in its own segment. At 404, a segmental grouping $M^{i+1}$ is formed by removing a boundary. At 406, the method calculates $T_L(S, M^{i+1})$. At 408, the method determines if the removing of the boundary would cause a decrease in cost (i.e., if $T_L(S, M^{i+1}) < T_L(S, M^i)$). If it does, then the method returns to 404. Boundaries are removed recursively in the segmental grouping until, at the t-th recursion, a boundary b is identified in the segmental grouping $M^t$ which removal causes the maximum decrease in $T_L(S, M^t)$. By removing the boundary b, the method obtains the segmental grouping $M^{t+1}$. If no boundary exists that causes cost reduction, the method stops and outputs at 410 the segmental grouping $M^t$. Since there are at most n−1 candidate boundaries for removal, the method processes through at most n−1 iterations.

In each iteration, the boundary with the largest reduction in the total cost is identified for removal. Using a heap data structure this identification can be completed in O(1) time. The entries of the heap at iteration t are the boundaries of the segmental grouping $M^t$, which is identified herein as $\{b_1, \ldots, b_l\}$. Each boundary $b_j$ is associated with an impact of its removal from $M^t$. We refer to that impact as $G(b_j)$, and define it as the change in the total description length $T_L(S, M^t)$ that is caused by the removal of $b_j$ from $M^t$. The impact is positive if the total description length $T_L(S, M^t)$ is increased, and negative if the total description length $T_L(S, M^t)$ is decreased. For every point $b_j$ at iteration t, the value of $G(b_j)$ is the cost of describing $S[b_{j-1}, b_{j+1}-1]$ after removing $b_j$ and merging segments $[b_{j-1}, b_j]$ and $[b_j, b_{j+1}-1]$ into a single element, minus the cost of describing the same portion of the data using the two segments $[b_{j-1}, b_j]$ and $[b_j, b_{j+1}-1]$. This can also be described more succinctly as:

$$G(b_j) = L_L*(S[b_{j-1}, b_{j+1}-1]) + \log n -$$
$$L_L*(S[b_{j-1}, b_j-1]) + \log n - L_L*(S[b_j, b_{j+1}-1]) + \log n.$$

Upon the removal of boundary $b_j$ at iteration t, the impacts of boundaries $b_{j-1}$ and $b_{j+1}$ are updated. With tracking, this means that $L_L^*(S_i)$ is evaluated for two different intervals per update, and thus takes $O(2T_L)$ time. One heap update per iteration takes $O(\log n)$ time. Therefore, the total running time of the Greedy method is $O(T_L n \log n)$. In another embodiment, this time can be decreased by considering as candidate segment boundaries only those timestamps on which an event (of any type) occurs. Therefore, since the recursion does not have to go through all the points $\{1, \ldots, n\}$ but instead just those points on which events actually occur, in use, the time to evaluate $L_L(S[I])$ using the Greedy method is faster than $O(T_L n \log n)$; it is $O(T_L |T| \log |T|)$, where $|T| \leq n$.

Local Models: In the above description, both Segment-DP and Greedy uses a method that evaluates the minimum number of bits that can be used to encode $S_i$ (i.e., $L_L^*$) for different data intervals. In an exemplary embodiment, the following technique is used to identify the local model that minimizes $L_L$. This technique can be described as follows: Given a sequence S and interval $I \subset [1;n]$, calculate an optimal local model $M_i$ that minimizes the local description length of $S_i = S[I]$ given $M_i$. This can also be described as: find $M_i$ such that $$M_i = \operatorname*{argmin}_{M_i'} L_L(S_i, M_i')$$
$$= \operatorname*{argmin}_{M_i'} L_D(S_i | M_i') + L_M(M_i')$$

(a) Local-DP: One embodiment of the present invention calculates the optimal local model $M_i$ that minimizes the local description length optimally in polynomial time using a dynamic-programming method we developed herein called Local-DP. In an embodiment using Local-DP, the grouping of the event types in an interval I respects the ordering of event types with respect to their frequency of appearance in S[I]. Stated in another way, for an interval I and $S_i = S[I]$, when the events in the set $\epsilon$ of different event types are ordered so that $n(E_1, I) \geq n(E_2, I) \geq \ldots \geq n(E_m, I)$, and when the optimal local model $M_i$ constructs l groups $X_1, \ldots$, then, if $E_{j1} \in X_l$ and $E_{j2} \in X_l$, with $j_2 > j_1$, then for all $E_j$'s such that $j' \in \{j_1+1, \ldots, j_2-1\}$, we have that $E_{j'} \in X_l$.

The value of the optimal parameters $p(X_j)$ is the mean of the occurrence probabilities of each event type $E \in X_j$ within the interval I. So, for the interval $I \subset [1;n]$, and a local model $M_i$ for data in $S_i = S[I]$, if $M_i$ partitions the set $\epsilon$ into groups $X_1, \ldots, X_l$, then, for every $X_j$, with $1 \leq j \leq l$, the value of the parameter $p(X_j)$ that minimizes $L_D(S_i | M_i')$ is $$p(X_j) = \frac{1}{|X_j|} \sum_{E \in X_j} \frac{n(E, I)}{|I|}$$

Given that event types in the set $\epsilon$ are ordered as discussed above (i.e., $n(E_1, I) \geq n(E_2, I) \geq \ldots \geq n(E_m, I)$), we use $\epsilon(i)$ to denote the event type at the j-th position of the order and $\epsilon(j, l)$ to denote the set of event types at positions $j, j+1, \ldots, l-1, l$ in that order. $S_i[j, l]$ is used to denote the subset of the events in $S_i$ that correspond to event types in $\epsilon(j, l)$.

Thus, one embodiment of the present invention, given the ordering of the events types in the set $\epsilon$ as described above, uses the following dynamic-programming recursion to compute the minimum number of bits used to encode $S_i$:

$$L_L*(S_i[1, j]) = m \log m + \min_{1 \leq l \leq j} \{L_L*(S_i[1, l]) + U(S_i[l+1, j]) + 2\log(m)\}$$

wherein $$U(S_i[l+1, j]) =$$
$$-\sum_{E \in \epsilon(l+1, j)} n(E, I_i) \log p^* - \sum_{E \in \epsilon(l+1, j)} (|I| - n(E, I_i)) \log(1 - p^*)$$

wherein $$p^* = \sum_{E \in \epsilon(l+1, j)} \frac{n(E, I)}{|I|}.$$

The m log m term in the above corresponds to the cost of encoding the ordering of the event types in $S_i$, while the term 2 log m corresponds to the cost of encoding the number of bits used to encode the occurrence probability of any event type in the group $\epsilon(l+1, j)$ and the group itself. The order of the event types is sent only once per segment, while the probability of event appearance per group and the group information itself is sent once per group.

The running time of Local-DP is $O(m^2)$. This is because for every index j the method recurses over all values of l in the interval $1 \leq l \leq j$. Since the largest value of j is m, the running time of Local-DP is $O(m^2)$. This quadratic running time assumes that in a preprocessing step we compute the values of the U( ) function for all the combination of indices j and l. In fact, the asymptotic term $O(m^2)$ also contains the hidden cost of sorting the event types in $\epsilon$ based on their frequency of occurrence in $S_i$, which is $O(m \log m)$. Event types that do not occur in $S_i$ can be ignored when evaluating the Local-DP recursion, like the situation described above. Therefore, if there are $m_0 < m$ event types appearing in $S_i$, the actual running time of the Local-DP recursion is $O(m'^2)$.

(b) Local-Greedy: In one embodiment, as an alternative to Local-DP, a greedy technique that we developed called LocalGreedy is used. Similar to the Greedy technique above for finding the optimal segment boundaries in [1,n], by using the same data structures as the ones described for Greedy, the running time of the LocalGreedy is $O(m \log m)$. Moreover, by taking advantage of the preceding discussion above, the running time of the LocalGreedy can be further reduced to $O(m' \log m')$, where m' is the number of different event types appearing in data segment $S_i$.

As with Greedy, LocalGreedy computes the global partitioning X of $S_i$ in a bottom-up fashion. It starts with grouping $X^1$, where each event type is allocated its own group. At the t-th step of the technique, grouping $X^t$ is considered, and the technique merges the two groups that introduce the maximum decrease in $L_L(S_i, M_i)$. This merge leads to partition $X^{t+1}$. If no merging exists that causes cost reduction, LocalGreedy stops and outputs partition $X^t$.

As described above, both Segment-DP and Greedy uses a function that evaluates $L_L^*$ for different data intervals. In some embodiments, the function is Local-DP. In other embodiments, the function is LocalGreedy. Segment-DP-Local-DP gives an optimal solution to the summarization problem. However, the other combinations also provide high-quality results, while giving considerable computational speedups. In terms of asymptotic running times the Segment-DP-Local-DP takes $O(n^2 m^2)$ time, the Segment-DP-Local-Greedy takes $O(n^2 m \log m)$ time, the Greedy-Local-DP takes $O(m^2 n \log n)$ time and the Greedy-LocalGreedy method takes $O(nm \log n \log m)$ time.

FIG. 5 shows sample segmental groupings outputted in accordance with embodiments of the present invention using the input same event sequence. FIG. 5(a) shows a sample segmental grouping outputted when the combination of Segment-DP-Local-DP is used. FIG. 5(b) shows a sample segmental grouping outputted when the combination of Segment-DP-LocalGreedy is used. FIG. 5(c) shows a sample segmental grouping outputted when the combination of Greedy-Local-DP is used. FIG. 5(d) shows a sample segmental grouping outputted when the combination of Greedy-LocalGreedy is used. In each of FIGS. 5(a)-5(d), the x-axis corresponds to the timeline that is segmented, with the vertical lines defining the segment boundaries on the timeline. Within each segment, different groups of event types are represented by different fill patterns (darker fill patterns represent groups that have higher probability of occurrence within a segment). The vertical length of each group is proportional to its size. A conclusion that can be drawn from FIG. 5 is that the output segmental groupings of Segment-DP-Local-DP and Segment-DP-LocalGreedy are almost identical, and the outputs of the four different combinations are similar: all four segmentations have a large segment in the beginning of the observation period and an even larger segment towards its end. In the segments the same number of groups is observed. In the interval that is in-between these two large segments the outputs of Segment-DP-Local-DP, Segment-DP-LocalGreedy and Greedy-Local-DP exhibit very similar structure, by identifying almost identical segment boundaries. Seemingly different are the boundaries found by Greedy-LocalGreedy combination. However, a closer look shows that these latter boundaries are not far from the boundaries identified by the other three algorithmic methods; Greedy-LocalGreedy identify boundary positions very close to the boundary positions identified by the other three combinations.

Table 1 below shows results of experiments we conducted applying methods and a system of the present invention on three different real datasets: an application log, a security log, and a system log. Each of the three logs stored records with the following fields: Event_Type, Date, Time, Source, Category, Event, User, and Computer. In this example, we exported each one of the three logs into a separate file and we processed each of the files individually.

The application log spanned a period from June 2007 to November 2007. The security log spanned a period from May 2007 to November 2007. The system log spanned a period from November 2005 to November 2007. For all these files we consider all the logged events found on our computer, without any modification. The timestamps on the timeline correspond to distinct milliseconds. Table 1 describes the characteristics of the datasets when we considered as event types the unique combinations of Event_Type, Source and Event and as timestamps of events the combination of Date and Time. The results of experiments for these datasets follow in the same table.

TABLE 1

|  | Application Log | Security Log | System Log |
| --- | --- | --- | --- |
| Observation period | June 2007-November 2007 | May 2007-November 2007 | November 2005-November 2007 |
| Observation period (milliseconds) | 12,313,576,000 | 14,559,274,000 | 61,979,383,000 |
| Number of events (N) | 2673 | 7548 | 6573 |
| Number of event types (m) | 45 | 11 | 64 |
| Running Times (seconds) | | | |
| Segment-DP-Local-DP | 3252 | 2185 | 34691 |
| Segment-DP-LocalGreedy | 976 | 2373 | 8310 |
| Greedy-Local-DP | 18 | 1 | 91 |
| Greedy-LocalGreedy | 7 | 1 | 24 |
| Total Description Length (bits) [CR] | | | |
| Segment-DP-Local-DP | 49451.71 [0.04] | 116752.98 [0.32] | 122560.19 [0.03] |
| Segment-DP-LocalGreedy | 49452.42 [0.04] | 116887.77 [0.32] | 122560.68 [0.03] |

TABLE 1-continued

|  | Application Log | Security Log | System Log |
|---|---|---|---|
| Greedy-Local-DP | 49473.66 [0.04] | 123476.24 [0.34] | 123071.37 [0.03] |
| Greedy-LocalGreedy | 49576.86 [0.04] | 122655.86 [0.33] | 123077.51 [0.03] |
| | Model Description Length (bits) | | |
| Segment-DP-Local-DP | 690.18 | 9422.71 | 4573.32 |
| Segment-DP-LocalGreedy | 690.18 | 7088.56 | 4573.32 |
| Greedy-Local-DP | 690.18 | 40358.21 | 5504.60 |
| Greedy-LocalGreedy | 1124.93 | 34004.29 | 5504.60 |
| | Data Description Length (bits) | | |
| Segment-DP-Local-DP | 48761.53 | 107330.26 | 117986.87 |
| Segment-DP-LocalGreedy | 48762.23 | 109799.21 | 117987.36 |
| Greedy-Local-DP | 48783.47 | 83118.03 | 117566.77 |
| Greedy-LocalGreedy | 48451.93 | 88651.57 | 117572.90 |

Table 1 above also shows a compression ratio (CR) for each algorithmic method combination for each log. The CR provides one exemplary way to identify quality of a solution produced by various techniques of the present invention. The CR is the ratio of the total length of the description bits using the specified combination over the total length of the description bits if no summarization is performed. Stated in another way: If $M_C$ is the summary picked by combination C as a solution to the summarization problem with input S, then, the compression ratio of combination C is $CR(C)=T_L(S,M_C)/T_L(S,M_{unit})$. $M_{unit}$ is the model that describes every event on S separately; such a model has n segment boundaries (one segment per timestamp) and m groups per segment, corresponding to the model where no summarization is done. By definition, CR takes values in [0,1]. The smaller the value of CR(C), the better the compression achieved by the combination C.

Accordingly, as can be understood from the above description, features of various embodiments of the present invention include providing a full description of an event sequence while keeping the description short and accurate and at the same time identifying local associations among events; handling multiple event types; describing data within a segment using local model(s) that are more complex than a simple intensity model; using a special type of clustering model as a local model to represent data within a segment; and/or incorporating different local models.

In the description above, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to unnecessarily obscure the present invention.

For example, although the present invention is useful for forensic analysis of large audit logs, the methodology is also applicable to arbitrary event sequences that are generated by process-monitoring activities. The techniques presented herein can also be applied to other diverse domains or fields, including those dealing with appearances of words within a stream of documents, or motifs on genomic sequences which could be considered as event sequences. Useful summaries can be constructed for these domains using the present invention. Additionally, other local models may be used in combination with or as alternatives to Local-DP and/or Local-Greedy, including those known to those of ordinary skill in the art but not described so as not to unnecessarily obscure the present invention As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transported using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. It should be understood that use of the term computer herein in not limited to personal computers, but includes other types of computers including but not limited to analog computers, digital computers, special purpose computers, computers referred to as servers or clients, and other programmable data processing apparatus.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" throughout is not intended to mean the same method or same embodiment, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 6:
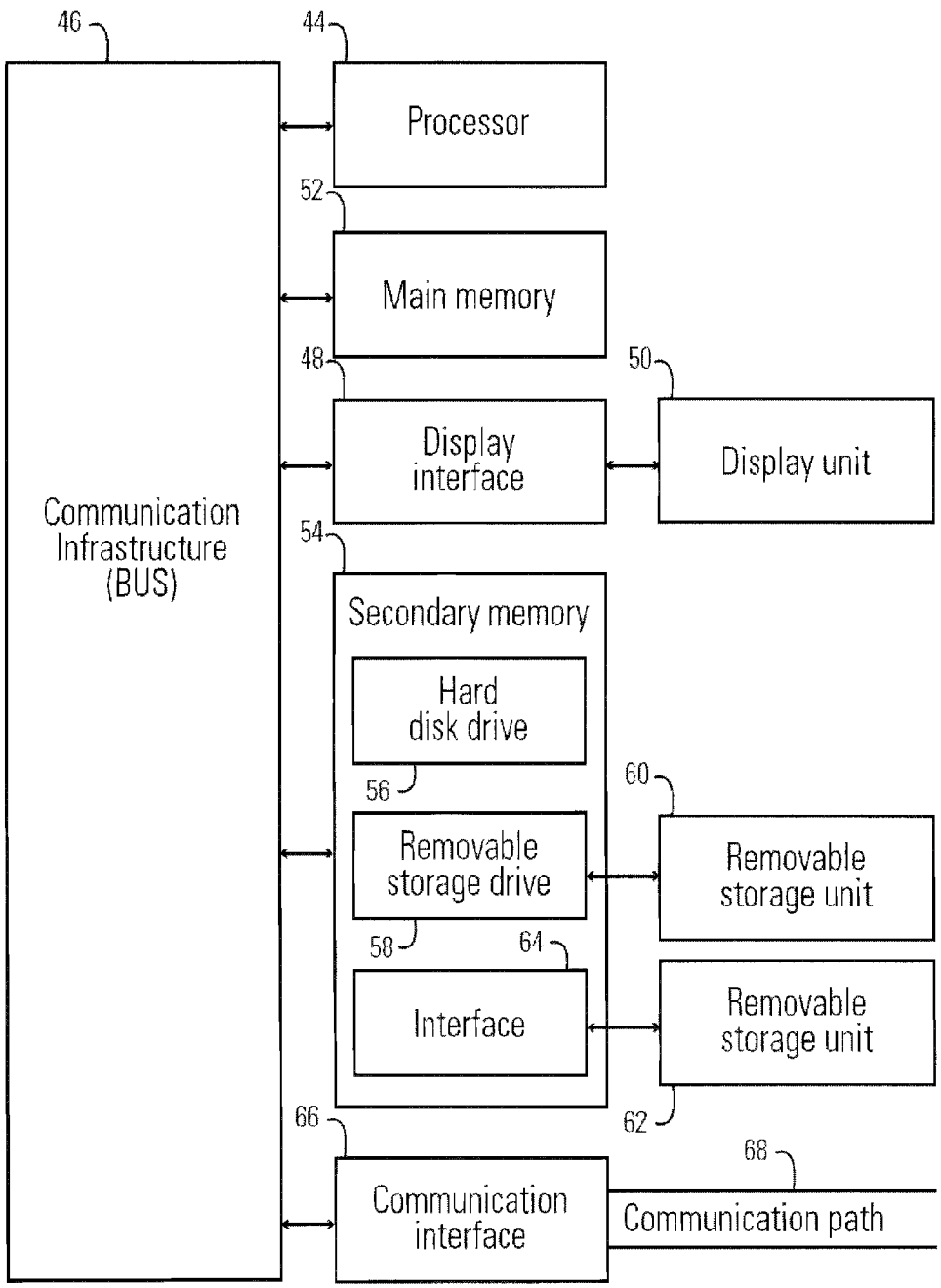
FIG. 6 is a high level block diagram showing an information processing system useful for implementing one embodiment of the present invention.

FIG. 6 is a high level block diagram showing an information processing system useful for implementing one embodiment of the present invention. The computer system includes one or more processors, such as processor 44. The processor 44 is connected to a communication infrastructure 46 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 48 that forwards graphics, text, and other data from the communication infrastructure 46 (or from a frame buffer not shown) for display on a display unit 50. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present invention as discussed herein. In particular, the computer programs, when executed, enable the processor 44 to perform the features of the computer system. Accordingly, such computer programs represent controllers of the computer system.

Figure 7:
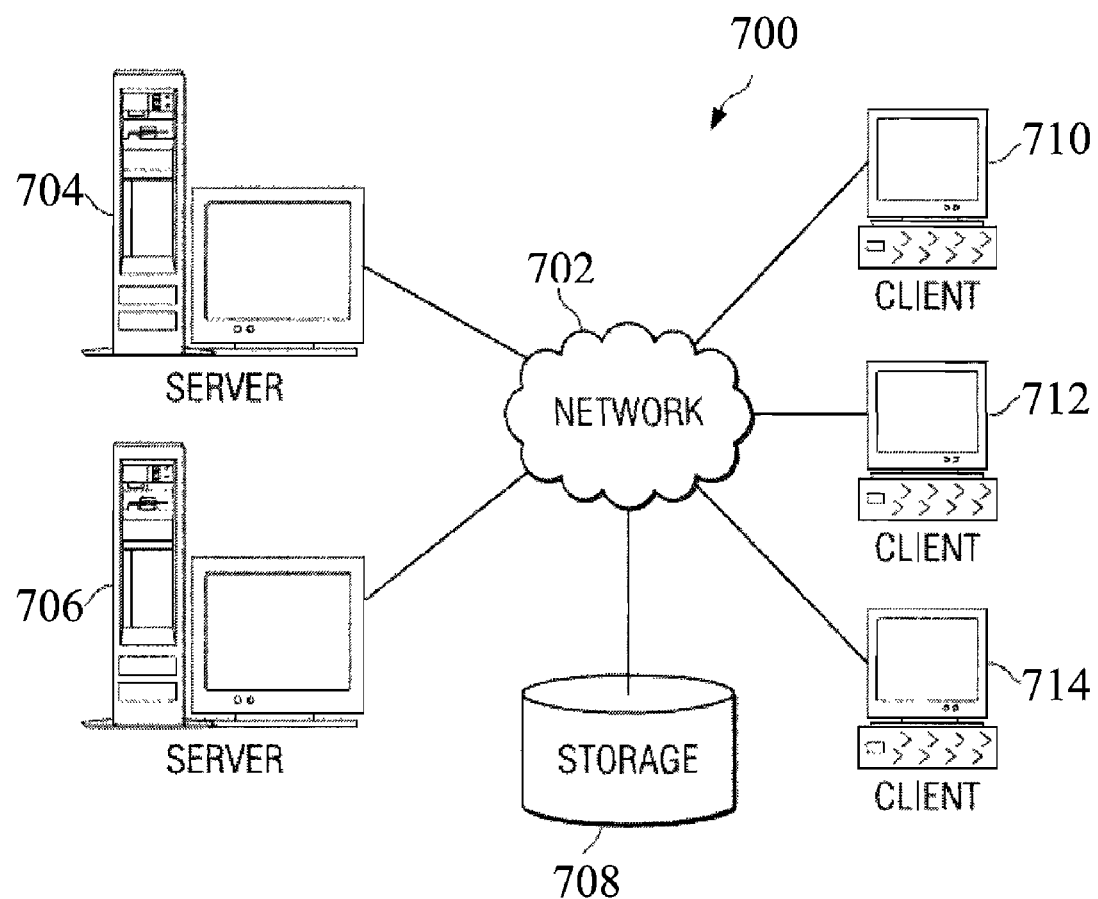
FIG. 7 represents an exemplary distributed data processing system in which aspects of the illustrative embodiments may be implemented.

FIG. 7 represents an exemplary distributed data processing system in which aspects of the illustrative embodiments may be implemented. Distributed data processing system 700 may include a network of computers in which aspects of the illustrative embodiments may be implemented. The distributed data processing system 700 contains at least one network 702, which is the medium used to provide communication links between various devices and computers connected together within distributed data processing system 700. The network 702 may include connections, such as wire, wireless communication links, or fiber optic cables.

In the depicted example, server 704 and server 706 are connected to network 702 along with storage unit 708. Storage unit 708 may be or include, for example, a database or database system storing the event sequences. In addition, clients 710, 712, and 714 are also connected to network 702. These clients 710, 712, and 714 may be, for example, personal computers, network computers, or the like. In the depicted example, server 704 provides data, such as boot files, operating system images, and applications to clients 710, 712, and 714. Clients 710, 712, and 714 are clients to server 704 in the depicted example. Distributed data processing system 700 may include additional servers, clients, and other devices not shown.

In the depicted example, distributed data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 700 may also be implemented to include a number of different types of networks, such as for example, an intranet, a local area network (LAN), a wide area network (WAN), or the like.

As stated above, FIG. 7 is intended as an example, not as an architectural limitation for different embodiments of the present invention, and therefore, the particular elements shown in FIG. 7 should not be considered limiting with regard to the environments in which the illustrative embodiments of the present invention may be implemented.

Having thus described the invention of the present application in detail and by reference to embodiments thereof, it will be apparent that modifications and variations are possible without departing from the scope of the invention defined in the appended claims.

What is claimed is:

1. A computer implemented Minimum Description Length (MDL) based method for constructing a summary of an event sequence S, the method balancing between over-generalizing and over-fitting descriptions of the event sequence S, the method comprising:
   receiving an event sequence S identifying events of different event types occurring over a time interval;
   segmenting the event sequence S into segments (S~, ..., Sk), wherein k is an integer, wherein the segmenting partitions the time interval into contiguous, non-overlapping intervals, wherein the segmenting minimizing a total cost TL(S,M) in bits for describing the event sequence S, wherein the total cost TL(SgV/) in bits consists of a number of bits used to identify segment boundaries segmenting the event sequence S into segments (S~, ..., Sk) and a total local cost LL(Si,Mi) in bits for describing each segment, wherein the total local costs $LL(S_i,M~)$ in bits consists of a number of bits used to identify a local model M~ and a number of bits used to describe the corresponding segment $S_i$ using the local model Mi, and wherein each local model M~ groups one or more events of one or more events types within the corresponding segment $S_i$ into one or more groups based on a frequency of occurrence of the events; and
   outputting a summary for the event sequence S, the summary indicating the segments (S~, ..., Sk) and the groups; and
   wherein the time interval is [1,n], and minimizing the total cost
   TL in bits comprises computing using the following:

$$TL(S, M) = \sim \log n + \sum_{i=1}^{k} LL(Si, M_i).$$

2. The method of claim 1, wherein the segmenting comprises:
   (a) identifying a segmental grouping $M^t$, wherein initially t is 1 and $M^1$ has k+1 segment boundaries and wherein, for $M^1$, each event of the event sequence S is in a different segment;
   (b) removing boundaries recursively in the segmental grouping $M^t$ until at a t-th recursion, a boundary b is identified in the segmental grouping $M^t$ which removal causes a maximum decrease in $T_L(S,M^t)$; and
   (c) if no boundary causes a decrease in $T_L(S,M^t)$, outputting $M^t$.

3. The method of claim 1, further comprising, determining a minimum value for LL(Si, Mi) using a greedy method.

4. The method of claim 3, wherein the greedy method is LocalGreedy.

5. The method of claim 1, further comprising, determining a minimum value for LL(Si, M3 using a dynamic programming method, and wherein the dynamic programming method is Local-DP.

6. The method of claim 1, wherein minimizing the total cost TL in bits comprises using a dynamic programming method, and wherein the dynamic programming method is Greedy.

7. The method of claim 1, wherein minimizing the total cost TL in bits comprises using a dynamic programming method, and wherein the dynamic programming method is Segment-DP.

8. The method of claim 1, wherein receiving an event sequence S identifying events of different event types comprises receiving an event sequence S identifying at least one thousand events, the one thousand events being of at least three different event types.

9. A computer program product for constructing, based on Minimum Description Length, a summary of an event sequence S, the computer program product comprising:
a computer usable medium having computer usable program code embodied therewith, the computer usable program code comprising:
computer usable program code configured to receive an event sequence S identifying events of different event types occurring over a time interval;
computer usable program code configured to segment the event sequence S into segments (S~, . . . , S~), wherein k is an integer, wherein the segmenting partitions the time interval into contiguous, non-overlapping intervals, wherein the segmenting minimizing a total cost TL(S, M) in bits for describing the event sequence S, wherein the total cost TL(S,M) in bits consists of a number of bits used to identify segment boundaries segmenting the event sequence S into segments (S~, . . . , Sk) and a total local cost LL(Si,M~) in bits for describing each segment, wherein the total local costs LL(Si,Mi) in bits consists of a number of bits used to identify a local model Mi and a number of bits used to describe the corresponding segment S~ using the local model M~, and wherein each local model M~ groups one or more events of one or more events types within the corresponding segment S~ into one or more groups based on a frequency of occurrence of the events; and
computer usable program code configured to output a summary for the event sequence S, the summary indicating the segments (S~, . . . , S~) and the groups; and
wherein the time interval is [1,n], and minimizing the total cost
TL in bits comprises computing using the following:

$$TL(S, M) = \sim \log n + \sum_{i=1}^{k} LL(Si, M_i).$$

10. The computer program product of claim 9, wherein computer usable program code configured to receive an event sequence S identifying events of different event types comprises computer usable program code configured to receive an event sequence S identifying at least one thousand events, the one thousand events being of at least three different event types.

11. A system for constructing a summary of an event sequence S, the system comprising:
a database system storing an event sequence S;
memory storing computer usable program code; and
a processor coupled to the data system to receive the event sequence S from the database system and coupled to the memory to execute the computer usable program code stored on the memory; wherein the computer usable program code comprises:
computer usable program code configured to receive an event sequence S identifying events of different event types occurring over a time interval;
computer usable program code configured to segment the event sequence S into segments (S~, . . . , Sk), wherein k is an integer, wherein the segmenting partitions the time interval into contiguous, non-overlapping intervals, wherein the segmenting minimizing a total cost TL(S,M) in bits for describing the event sequence S, wherein the total cost TL(S,M) in bits consists of a number of bits used to identify segment boundaries segmenting the event sequence S into segments (Sb . . . , Sk) and a total local cost LL(Si,Mi) in bits for describing each segment, wherein the total local costs LL(Si, Mi) in bits consists of a number of bits used to identify a local model M~ and a number of bits used to describe the corresponding segment S~ using the local model M~, and wherein each local model M~ groups one or more events of one or more events types within the corresponding segment S~ into one or more groups based on a frequency of occurrence of the events; and
computer usable program code configured to output a summary for the event sequence S, the summary indicating the segments (Sb . . . , Sk) and the groups; and
wherein the time interval is [1,n], and minimizing the total cost
TL in bits comprises computing using the following:

$$TL(S, M) = \sim \log n + \sum_{i=1}^{k} LL(Si, M_i).$$

12. The system of claim 11, wherein the memory storing computer usable program code comprises the memory storing computer usable program code for determining a minimum value for LL(Si, Mi) using a Greedy method;
Wherein the greedy method is LocalGreedy.

13. The system of claim 11, wherein a database system storing an event sequence S comprises a database system storing an event sequence S identifying at least one thousand events, the one thousand events being of at least three different event types.

* * * * *